United States Patent [19]

Szczepanek et al.

[11] Patent Number: 5,717,932
[45] Date of Patent: Feb. 10, 1998

[54] DATA TRANSFER INTERRUPT PACING

[75] Inventors: Andre Szczepanek, Bedford, England; Denis R. Beaudoin, Missouri City, Tex.

[73] Assignee: Texas Instruments Incorporated, Dallas, Tex.

[21] Appl. No.: 334,511

[22] Filed: Nov. 4, 1994

[51] Int. Cl.⁶ .................................................. G06F 13/00
[52] U.S. Cl. .......................... 395/733; 395/557; 395/309
[58] Field of Search .................................. 395/297, 304, 395/865, 733, 734, 735, 736, 557, 308; 370/85.1

[56] References Cited

U.S. PATENT DOCUMENTS

| | | | |
|---|---|---|---|
| 3,851,104 | 11/1974 | Willard et al. | 370/85.1 |
| 4,023,143 | 5/1977 | Braunstein | 395/736 |
| 4,099,255 | 7/1978 | Stanley et al. | 395/733 |
| 4,161,786 | 7/1979 | Hopkins et al. | 395/297 |
| 4,218,739 | 8/1980 | Negi et al. | 395/735 |
| 4,481,572 | 11/1984 | Ochsner | 395/297 |
| 4,823,312 | 4/1989 | Michael et al. | 395/250 |
| 4,935,894 | 6/1990 | Ternes et al. | 395/308 |
| 4,969,120 | 11/1990 | Azevedo et al. | 395/297 |
| 4,979,100 | 12/1990 | Makris et al. | 395/297 |
| 5,032,982 | 7/1991 | Dalrymple et al. | 395/350 |
| 5,165,032 | 11/1992 | Herbault | 395/200.06 |
| 5,255,373 | 10/1993 | Brockmann et al. | 395/325 |
| 5,287,458 | 2/1994 | Michael et al. | 395/250 |
| 5,307,459 | 4/1994 | Peterson et al. | 395/200.03 |
| 5,377,332 | 12/1994 | Entwistle | 395/297 |
| 5,386,573 | 1/1995 | Okamoto | 395/733 |
| 5,392,435 | 2/1995 | Mashi et al. | 395/733 |
| 5,423,049 | 6/1995 | Kurihara | 395/733 |
| 5,469,543 | 11/1995 | Nishihara et al. | 395/200.06 |
| 5,475,816 | 12/1995 | Yonezawa et al. | 395/200.06 |
| 5,506,975 | 4/1996 | Onodera | 395/733 |
| 5,506,993 | 4/1996 | Fitch et al. | 395/735 |

*Primary Examiner*—Ayaz R. Sheikh
*Attorney, Agent, or Firm*—J. Dennis Moore; James C. Kesterson; Richard L. Donaldson

[57] ABSTRACT

A communications network adapter of the type coupling a computer, in which the computer includes a microprocessor, main memory and a system bus, that controls host interrupts in a manner to improve system performance. The adapter includes a buffer memory for storing data to be transferred between the bus an the network, and a transfer controller that controls the transfer of data between the main memory and the buffer memory and between the network and the buffer memory. The adapter also includes an interrupt controller that monitors predetermined events relating to data transfer between the computer and the network, and that causes the sending of interrupt signals to the microprocessor. Interrupt signals cause the microprocessor to initiate processing associated with the transfer of data between the computer and the network. According to one aspect of the invention the adapter includes an interrupt pacing timer that prevents the sending of interrupts to the microprocessor from the adapter for predetermined time after an interrupt acknowledgement signal is received from the microprocessor. According to another aspect of the invention an interrupt threshold counter is provided that prevents the sending of interrupts to the microprocessor until a predetermined plurality of frames are transmitted.

9 Claims, 3 Drawing Sheets

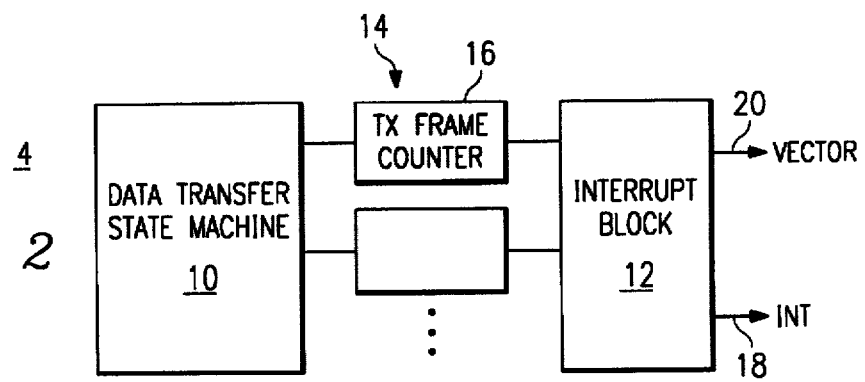
FIG. 2
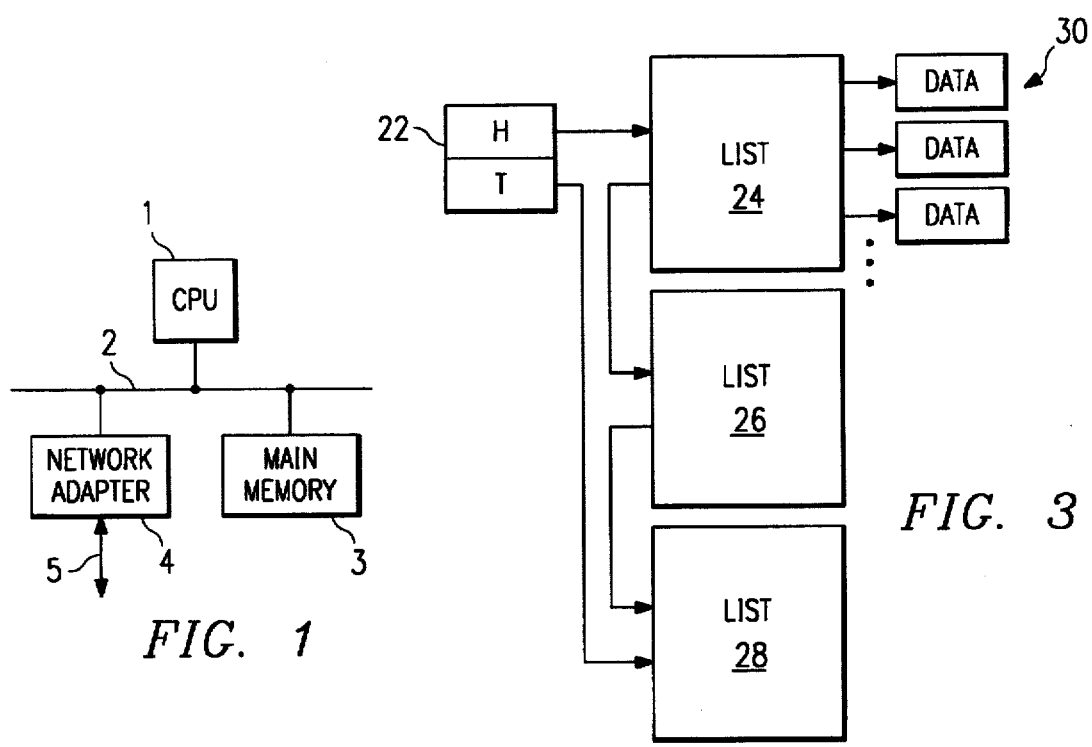
FIG. 3
FIG. 1
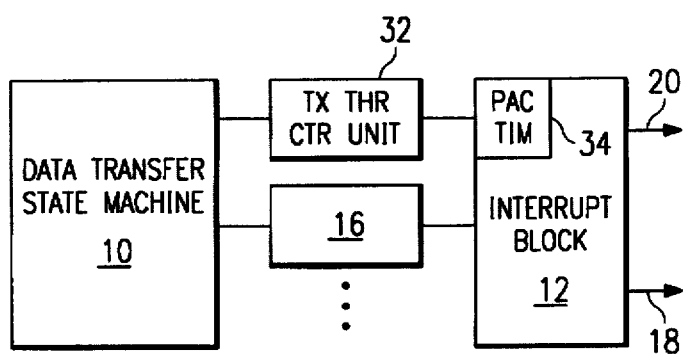
FIG. 4

DATA TRANSFER INTERRUPT PACING

BACKGROUND OF THE INVENTION

1. Field of the Invention

The present invention relates to communications network adapters that couple a computer to a network, and more particularly relates to such an adapter in which adapter behavior is modified to optimize overall system performance.

2. Background Art

The overall performance of a network adapter, such as a local area network ("LAN") adapter is determined by the performance of the hardware and the efficiency of the software network drivers. An adapter may be capable of a high rate of data transfer, frequently expressed in terms of frame through-put, but unless the host network drivers are capable of transferring frames to and from the adapter at these rates, that performance is not realizable in a real system.

One problem that can hinder realization of optimal adapter data transfer performance is the requirement that the host system service the adapter, which need for services is communicated to the host system by way of interrupts. Every time a host microprocessor receives such an interrupt it must stop the task, or tasks, it is handling at the time, and take the necessary action to prepare itself to service the interrupt. Modem microprocessors have cache memories of a considerable size which must be flushed as a part of this preparation. Further, some of the more sophisticated modem microprocessors, in addition to having cache memories of significant size, have a parallel pipeline architecture. In addition to flushing their caches, such microprocessors must also flush their pipelines in order to prepare for this service of the network adapter. Also, once having finished the service of the network adapter, the microprocessor must reverse the process, flushing the cache and pipeline in order to change its environment to the environment it was in when the interrupt first occurred.

All of this flushing of cache and pipeline requires processing time, which detracts from the overall system performance. With the emergence of high speed LANs, such as the 100 MBIT/S CSMA/CD, network adapters now deal in an environment of frame rates of over one hundred thousand frames per second. The interrupt rates resulting from such network adapters are high enough to have a seriously degrading effect on overall system performance.

Another key factor, in the area of network adapters, affecting overall system performance, is the complexity and the efficiency of the interface between the hardware and the software. That is, the less host processing required per frame of data transferred, the more frames the host can process.

The present invention provides a network adapter interface apparatus and method that significantly enhances overall system performance by reducing the number of host operations to service a frame, and by reducing the member of network interrupts.

SUMMARY OF THE INVENTION

In accordance with the present invention, a communications network adapter is provided, coupling a computer, wherein the computer includes a microprocessor, main memory and a system bus interconnecting the microprocessor and the main memory, to a network. The adapter includes a buffer memory for storing data intended for transfer between the bus and the network, and a transfer controller that controls the transfer of data between the main memory and the buffer memory by way of the bus, and that controls the transfer of data between the network and the buffer memory. An interrupt controller is also provided, that monitors predetermined events related to data transfer between the computer and the network and causes the sending of interrupt signals to the microprocessor. The interrupt signals cause the microprocessor to initiate processing associated with the transfer of data between the computer and network. According to one aspect of the invention an interrupt pacing timer is also provided that prevents the sending of interrupts to the microprocessor for a predetermined time period after an interrupt acknowledgement signal is received from the microprocessor. In accordance with another aspect of the invention an interrupt threshold counter is provided that prevents the sending of interrupts to the microprocessor until a predetermined plurality of frames are transmitted.

DESCRIPTION OF THE DRAWINGS

The above set forth and other features of the present invention are made more apparent in the ensuing Detailed Description of the Preferred Embodiments, when read in conjunction with the attached drawings, wherein:

FIG. 1 is a block diagram of a communications network subsystem, including a CPU, main memory and a network adapter;

FIG. 2 is a block diagram of a pertinent portion of a network adapter;

FIG. 3 is a diagram showing the structure of linked lists representing frames for network transmission;

FIG. 4 is a block diagram showing a transmit threshold counter and an interrupt pacing counter;

DETAILED DESCRIPTION OF THE PREFERRED EMBODIMENTS

Figure 5:
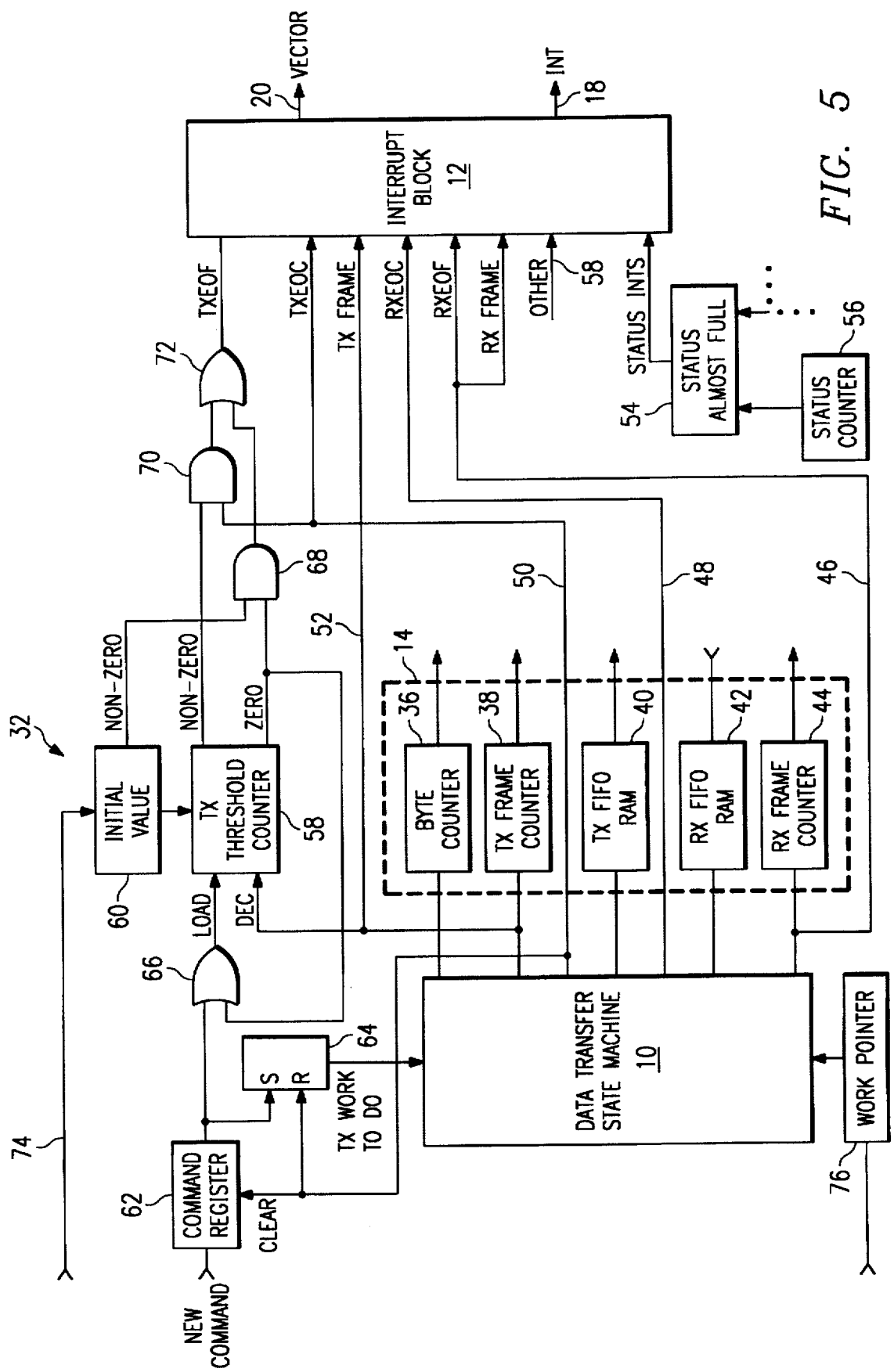
FIG. 5 is a detailed diagram of a portion of a network adapter showing a preferred embodiment of a transmit threshold counter.

FIG. 1 shows a computer system including a central processing unit 1, such as an 80486-compatible microprocessor, an external system bus 2, such as a PCI bus, a main memory 3 (collectively sometimes referred to as the "host computer"), and a network adapter 4 connecting to a network 5, such as a LAN network and connecting, to the host computer via the system bus 2. In such systems, when data is communicated to or from the network 5, the network adapter 4 is given control of the system bus 2 and data is transferred between the network 5 and the main memory 3, in either a transmit or a receive operation.

FIG. 2 is a block diagram of pertinent portions of network adapter 4. Shown are a data transfer state machine 10 that controls the transfer of data between the main memory 3 (FIG. 1) and the network 5, and an interrupt block 12 utilized in communication with the CPU 1, that provides an interrupt signal to the CPU 1 and a value, known as a vector, that identifies to the CPU 1 the event associated with the interrupt. The data transfer state machine 10 operates in conjunction with a variety of counters and memories, such as FIFO memories, to accomplish data transfer. Included among these elements 14 is a transmit frame counter 16. The structure and operation of all of these elements is well known in the art.

As is known, when the transmit frame counter is incremented, indicating the complete transmission of a frame, the interrupt block is signaled causing the interrupt block to activate the interrupt line to the PCU 1. In configurations where frame throughput rates are high, the resultant interrupt activity can seriously degrade the overall performance of the system, as the CPU 1 switches between network adapter interrupt tasks and other tasks.

FIG. 3 is an illustration of the structure of a data structure known as a list, which is also well known in the art. Data to be transferred over a network via a network adapter is organized in the host processor main memory 3 (FIG. 1) in linked lists. A data structure 22 known as a list pointer contains a value, called the "head pointer", that points to the beginning of a first list 24. List 24 is the first list in a series of linked lists 24, 26, 28, as shown. List 24, like the other lists is comprised of a list of pointers to blocks of data 30, to be transferred by the network adapter. This structure allows many blocks of data 30, organized in lists 24, 26, 28, representing frames to be sent through a single command. The command merely points to the pointing data structure 22, and a routine is executed to send the data blocks 30 which, because of the linked structure shown in FIG. 3, do not require further intervention of the microprocessor to locate the blocks of data 30. In the local area network art, a block or a group of blocks indicated by one list comprise a frame.

FIG. 4 is a high level block diagram similar to that shown in FIG. 2, showing a data transfer state machine 10, interrupt block 12 and elements associated with the data transfer 14, as before. However, newly presented in accordance with the preferred embodiment is a transmit threshold counter 32 and a pacing timer 34, as shown. The transmit threshold counter 32 monitors the number of frames that have been successfully completed, and only after a predetermined number of such frames have been transmitted does it communicate with the interrupt block 12 to cause the sending of an interrupt associated with such transmissions. Pacing timer 34 monitors all events giving rise to an interrupt and allows interrupts to be communicated to the CPU 1 only after a predetermined time interval after the successful servicing of the previous interrupt.

FIG. 5 is a detailed diagram of the pertinent portions of a network adapter showing the operation of a preferred embodiment of the invention that includes a transmit threshold counter unit 32. As can be seen, the data transfer state machine 10 is connected to a series of known elements 14, including a byte counter 36 that counts the number of bytes transferred in a given operation, transmit frame counter 38 that counts the number of frames transmitted in a given operation, transmit FIFO RAM 40 wherein data being transmitted is stored, receive FIFO RAM 42 where data being received is stored, and finally, a receive frame counter 44 that counts the number of frames received in a given operation.

The data transfer state machine 10 also provides signals on lines 46, 48, 50 and 52, associated with interrupt-type activity. Thus, on line 46 a receive end of frame ("RXEOF") signal is provided which, as shown, is also used as the receive frame ("RXFRAME") signal applied to interrupt block 12. Line 48 provides the receive end of command ("RXEOC") signal to interrupt block 12, and line 50 provides the transmit end of command ("TXEOC") signal thereto. Finally, line 52 provides the transmit frame ("TXFRAME") frame to interrupt block 12. It will be noted that interrupt block 12 receives status interrupt signals from a logic block 54 identified as STATUS ALMOST FULL, that signals the interrupt block 12 when any one of a plurality status counters 56 are reaching a count value where it is necessary for the host processor to read their value and reset them, to avoid loss of status information. Other interrupt-related signals are provided to interrupt block 12, as shown by line 58. All of the foregoing description in connection with FIG. 5 is well known in the art.

The operation of the transmit threshold counter unit 32 will now be described. This unit is comprised of a transmit threshold counter 58, an initial value register 60 another logic which will now be described. These are a command register 62 that receives a new command from the host processor, a set reset latch 64, OR gate 66, AND gate 68, AND gate 70 and OR gate 72, interconnected as shown in FIG. 5.

As mentioned previously, the command register 62 receives a command from the host processor. This register 62 is cleared in a transmit operation by the TXEOC signal on line 50, which indicates that the previous command is completed, thereby occasioning the need to clear register 62 to ready it to receive the next command. The signal on line 50 also resets latch 64, readying it to be set by the output of register 62, indicating that a new command has been received, thereby causing latch 64 to signal the data transfer state machine 10 that there is new transmit work to do. The loading of a new command in register 62 also signals, through OR gate 66, the transmit threshold counter 58 to load a new value. This value is stored in initial value register 60, and is received on line 74 from the host computer. This value is selected by the programmer of the system in which the network adapter exists to represent the number of frames to be transmitted before an interrupt is signaled to the CPU 1, in accordance with the principles described hereinabove. The transmit threshold counter 58 is decremented from this initial value by the transmit frame signal on line 52, as shown.

Provided the initial value loaded in register 60 is non-zero, when transmit threshold 58 counts down to zero, the output of AND gate 68 goes active, thereby signaling through OR gate 72 to interrupt block 12 that a transmit end of frame interrupt should be generated. Note that if a zero value is loaded in register 60, the output of AND gate 68 will never be high, and a transmit end of frame interrupt signal (the output of OR gate 72) will never be generated. This capability is provided as an option to the system programmer.

Note also that AND gate 70 allows for the generation of a transmit end of frame "TXEOF" signal even when the transmit threshold counter 58 is not yet counted down to zero, resulting in its non-output being active, when a transmit end of command signal is received. This provision is necessary to allow all frame processing to be handled only by the TXEOF event, eliminating the need for the TXEOC event from processing any frames, hence further reducing driver complexity.

Finally, note that the transmit threshold counter 58 is reset by the loading of the value of register 60 when it counts down to zero, through the feedback of the zero output through OR gate 66. This assures that even if a new command has not been loaded into register 62, none-the-less if the requisite number of frames have been transferred so as to generate the TXEOF signal, counter 58 will be set back to the intitial value 60.

Thus is can be seen that the transmit threshold counter unit 32 causes the network adapter unit to withhold the sending of transmit frame-related interrupt signals to the host processor until a preset number of frames have been sent.

Figure 6:
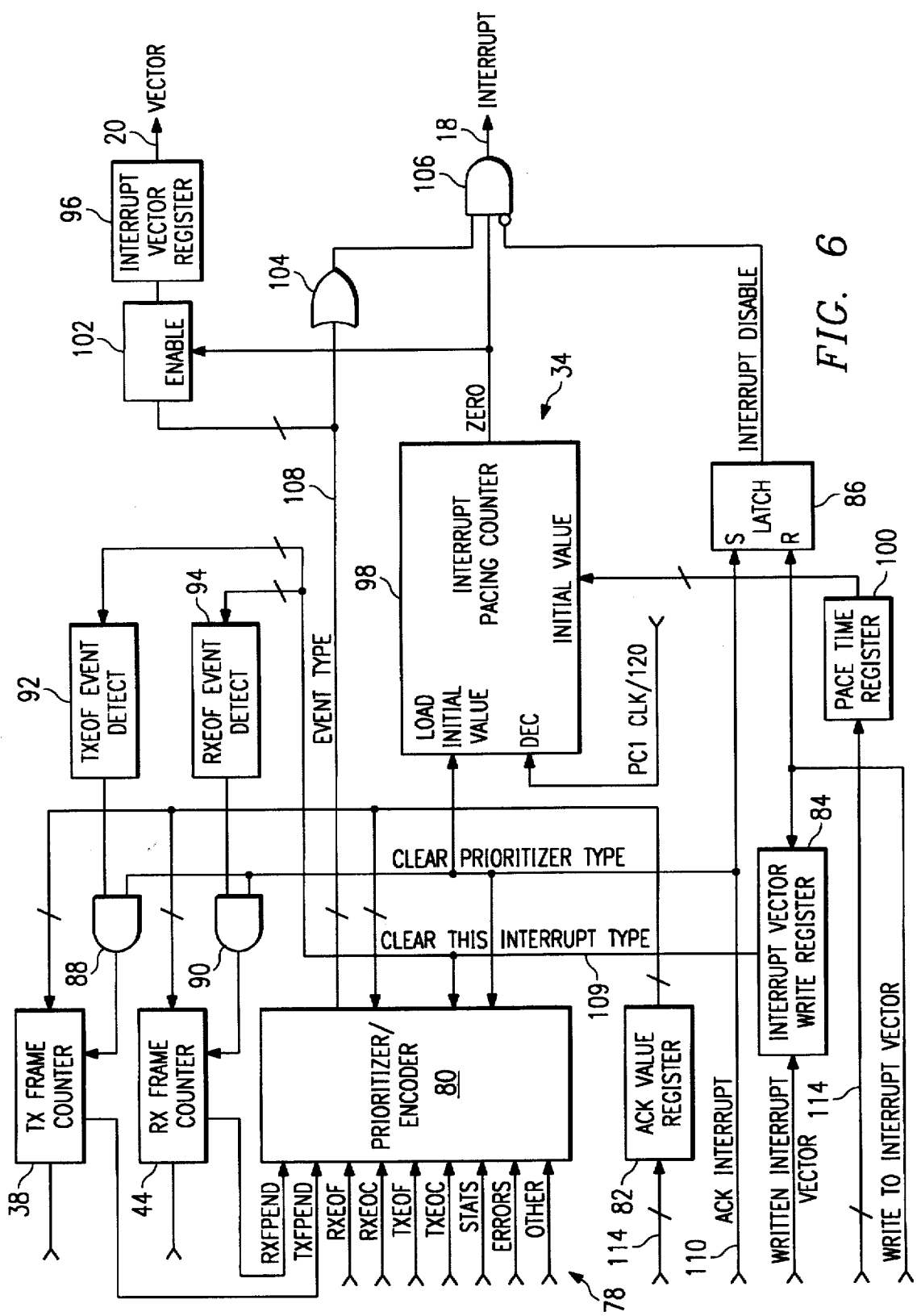
FIG. 6 is a detailed diagram of a portion of a network adapter showing a preferred embodiment of an interrupt pacing counter.

FIG. 6 is a detailed diagram of interrupt unit 12 of FIG. 5. The various signal lines 78 shown in FIG. 5 entering interrupt block 12 can be seen in FIG. 6 entering a prioritizer/Encoder unit 80. Further details are shown of the connections of the transmit frame counter 38 and receive frame counter 44 of FIG. 5, as well as additional elements which will now be described. Also shown are an acknowledgement value register 82, interrupt vector write register 84, set reset latch 86, AND gates 88 and 90, transmit end of frame event detector 92, receive end of frame event detector 94 and interrupt vector read register 96. The foregoing elements described hereinabove in conjunction with FIG. 6 are well known in the art, being conventional logic elements in network adapters.

Additionally shown in FIG. 6 are an interrupt pacing counter 98 and associated pace time initial value register 100, multiple input gate 102, multiple input OR gate 104 and AND gate 106.

In operation, an event giving rise to the need for an interrupt appears as a signal on one of the lines 78 applied to the Prioritizer/Encoder 80. Prioritizer/Encoder 80 generates a code representative of the type of event just signaled, and provides it as an output on line 108. When enabled, gate 102 shows the loading of the event type in interrupt vector read register 96. When the interrupt is serviced by the CPU 1, the interrupt read vector is written back to the interrupt vector write register 84, which provides the value to Prioritizer/Encoder 80 on line 109. Prioritizer/Encoder 80 then clears that event type. In addition, when a TXEOF event or RXEOF event is put on line 109, event detector 92 or 94, respectively, provides an output. If a TXEOF event is detected, when the ACK interrupt signal is received from the host on line 110, AND gate 88 permits the transmit frame counter 38 to be decremented by the ACK value register 82. Likewise, when an RXEOF event is detected, when the ACK interrupt signal is received AND gate 90 permits the RXFRAME counter 44 to be decremented by the ACK value register 82. The outputs of these counters 38, 44, are applied to the prioritizer/Encoder 80, as shown.

When the routine associated with the present interrupt is started, the host processor provides a signal known as the written interrupt vector, which is applied to the interrupt vector write register 84, as shown. The output of this logic unit is applied to the Prioritizer/Encoder 80, as shown, and causes the present interrupt type to be cleared and the associated counters to be decremented as described in the previous paragraph when the ACK is processed, allowing the next pending event to rise to the top of the priority of event signals applied thereto, thereby allowing the next event to be serviced. Note that the host may, by activating signal line 110, and the previous written vector 109 will force a clearance of interrupt type in Prioritizer/Encoder 80, as shown.

Finally, when an ACK interrupt signal is received on line 110, accompanying this signal will be a value on multi-bit line 114, which is loaded into ACK value register 82. Depending upon the activity associated with the ACK interrupt signal, this value loaded in register 82 may be the number of transmit frames serviced value for decrementing counter 38, or the receive frame services value for decrementing counter 44. All of the foregoing principles of operation are well known in the network adapter art.

A pace time initial value register 100 loaded by the host processor which is the value of the minimum delay time from the ACK operation to the Interrupt being sent to the host processor, on the following interrupt.

When the ACK signal 110 is asserted, indicating the end of the interrupt service routine, the counter 98 is loaded with the stored initial value 100.

Counter 98 then begins decrementing, decrements being activated by a signal line comprising a clock derived from the bus or any similiar interval clock, but divided by 120, as shown. This derived clock provides timing signals having a duration of four microseconds, which has been determined to be a convenient decrement timing value for utilization in conjunction with values loaded in pace time register 100 for the selection of effective pace times for utilization in conjunction with counter 98. When counter 98 counts down to zero, it enables gate 102, and the event type on line 108 is loaded into the interrupt vector register 96. Simultaneously that signal is applied to an input of AND gate 106. Provided that a non-zero event type is on line 108, allowing a signal to pass through OR gate 104, and interrupts are not disabled, manifested by an active output of latch 86, interrupt line 18 is allowed to go active, thus signaling to the host that an interrupt requires service.

The net effect of the foregoing operation of counter 98 and the associated logic described in connection therewith is that, regardless of their source, interrupts are permitted to be signaled to the host processor on line 18 no more frequently than the value determined by the value loaded in pace time register 100. By setting this value to an appropriate level, overall system performance can be greatly enhanced by permitting the host microprocessor to complete the execution of tasks not associated with the service network adapter, and only then be required to flush cache and, if applicable pipelines, load the interrupt service routine for the event to be serviced for the network adapter and, finally, service that event.

Having thus described two aspects, namely the transmit threshold counter and interrupt pacing counter, of one particular embodiment of the invention, various alterations, modifications and improvements will readily occur to those skilled in the art. Such alterations, modifications and improvements as are made obvious by this disclosure are intended to be part of this description though not expressly stated herein and are intended to be within the spirit in scope of the invention. Accordingly, the foregoing description is by way of example only, and not limiting. The invention is limited only as defined in the following claims and equivalence thereto.

What is claimed is:

1. A communications network adapter for coupling a computer, said computer including a microprocessor, main memory and a system bus interconnecting said microprocessor and said main memory, to a network, comprising:

a buffer memory for storing data;

a transfer controller that controls the transfer of data between said main memory and said buffer memory by way of said bus and controls the transfer of data between said network and said buffer memory;

an interrupt controller that monitors predetermined events related to data transfer between the computer and the network and causes the sending of interrupt signals to the microprocessor, said interrupt signals causing the microprocessor to initiate processing associated with the transfer of data between the computer and the network; and an interrupt pacing timer that prevents the sending of interrupts to the microprocessor for a predetermined time period after an acknowledgement signal is received from the microprocessor for an interrupt previously sent to said microprocessor.

2. A communications network adapter for coupling a computer, said computer including a microprocessor, main memory and a system bus interconnecting said microprocessor and said main memory, to a network for the transfer of data, sent in groups of bytes called frames, between the computer and the network, comprising:

a buffer memory for storing data;

a transfer controller that operates to control the transfer of data between said main memory and said buffer memory by way of said bus and operates to control the transfer of data between said network and said buffer memory;

an interrupt controller that monitors predetermined events related to data transfer between the computer and the network and causes the sending of interrupt signals to the microprocessor, said interrupt signals causing the microprocessor to initiate processing associated with the transfer of data between the computer and the network; and an interrupt threshold counter that prevents the sending of interrupts to the microprocessor following initiation of a data transfer operation until a predetermined plurality of frames are transmitted.

3. A communications network adapter for coupling a computer, said computer including a microprocessor, main memory and a system bus interconnecting said microprocessor and said main memory, to a network, comprising:

a buffer memory for storing data;

a transfer controller that operates to control the transfer of data between said main memory and said buffer memory by way of said bus and operates to control the transfer of data between said network and said buffer memory;

an interrupt controller that monitors predetermined events related to data transfer between the computer and the network and causes the sending of interrupt signals to the microprocessor, said interrupt signals causing the microprocessor to initiate processing associated with the transfer of data between the computer and the network;

an interrupt pacing timer that prevents the sending of interrupts to the microprocessor for a predetermined time period after an acknowledgement signal is received from the microprocessor for an interrupt previously sent to said microprocessor; and an interrupt threshold counter that prevents the sending of interrupts to the microprocessor following initiation of a data transfer operation until a predetermined plurality of frames are transmitted.

4. A communications network sub-system, comprising:

a computer, said computer including
   a microprocessor,
   main memory, and
   a system bus interconnecting said microprocessor and said main memory;, and a network adapter interconnecting the system bus and the network, including
   a buffer memory for storing data,
   a transfer controller that controls the transfer of data between said main memory and said buffer memory by way of said bus and controls the transfer of data between said network and said buffer memory,
   an interrupt controller that monitors predetermined events related to data transfer between the computer and the network and causes the sending of interrupt signals to the microprocessor, said interrupt signals causing the microprocessor to initiate processing associated with the transfer of data between the computer and the network, and
   an interrupt pacing timer that prevents the sending of interrupts to the microprocessor for a predetermined time period after an acknowledgement signal is received from the microprocessor for an interrupt previously sent to said microprocessor.

5. A communications network sub-system, comprising:

a computer, said computer including
   a microprocessor,
   main memory, and
   a system bus interconnecting said microprocessor and said main memory; and a network adapter interconnecting the system bus and the network, including
   a buffer memory for storing data;
   a transfer controller that operates to control the transfer of data between said main memory and said buffer memory by way of said bus and operates to control the transfer of data between said network and said buffer memory;
   an interrupt controller that monitors predetermined events related to data transfer between the computer and the network and causes the sending of interrupt signals to the microprocessor, said interrupt signals musing the microprocessor to initiate processing associated with the transfer of data between the computer and the network; and
   an interrupt threshold counter that prevents the sending of interrupts to the microprocessor following initiation of a data transfer operation until a predetermined plurality of frames are transmitted.

6. A communications network system, comprising:

a computer, said computer including
   a microprocessor,
   main memory, and
   a system bus interconnecting said microprocessor and said main memory; and a network adapter interconnecting the system bus and the network, including
   a buffer memory for storing data;
   a transfer controller that operates to control the transfer of data between said main memory and said buffer memory by way of said bus and operates to control the transfer of data between said network and said buffer memory;
   an interrupt controller that monitors predetermined events related to data transfer between the computer and the network and causes the sending of interrupt signals to the microprocessor, said interrupt signals causing the microprocessor to initiate processing associated with the transfer of data between the computer and the network;
   an interrupt pacing timer that prevents the sending of interrupts to the microprocessor for a predetermined time period after an acknowledgement signal is received from the microprocessor for an interrupt previously sent to said microprocessor; and
   an interrupt threshold counter that prevents the sending of interrupts to the microprocessor following initiation of a data transfer operation until a predetermined plurality of frames are transmitted.

7. A communications network adapter for coupling a computer to a network; comprising:

means for controlling the transfer of data between said computer and said network; and an interrupt controller that monitors predetermined events related to data transfer between the computer and said network and causes the sending of interrupt signals to the computer, said interrupt signals causing the computer to initiate processing associated with the transfer of data between the computer and the network, said interrupt controller including means for providing an interrupt to the microprocessor only after a predetermined time period following the receipt of an acknowledgement signal from the computer for an interrupt previously sent to said microprocessor.

8. A communications network adapter for coupling a computer to a network; comprising:

means for controlling the transfer of data between said computer and said network in a data transfer operation; and an interrupt controller that monitors predetermined events related to data transfer between the computer and said network and causes the sending of interrupt signals to the computer, said interrupt signals causing the computer to initiate processing associated with the transfer of data between the computer and the network, said interrupt controller including means for providing an interrupt to the microprocessor following initiation of a data transfer operation only after a predetermined plurality of frames are transmitted.

9. A communications network adapter for coupling a computer to a network; comprising:

means for controlling the transfer of data between said computer and said network in a dab transfer operation; and an interrupt controller that monitors predetermined events related to data transfer between the computer and said network and causes the sending of interrupt signals to the computer, said interrupt signals causing the computer to initiate processing associated with the transfer of data between the computer and the network, said interrupt controller including means for providing an interrupt to the microprocessor only after a predetermined time period following the receipt of an acknowledgement signal from the computer for an interrupt previously sent to said microprocessor, and including means for providing an interrupt to the microprocessor following initiation of a data transfer operation only afar a predetermined plurality of frames are transmitted.

* * * * *